United States Patent [19]

Evjen

[11] Patent Number: 4,468,440
[45] Date of Patent: Aug. 28, 1984

[54] AIR HEATING AND COOLING SYSTEM FOR AIRCRAFT BATTERIES

[75] Inventor: John M. Evjen, Gainesville, Fla.

[73] Assignee: General Electric Company, Gainesville, Fla.

[21] Appl. No.: 380,578

[22] Filed: May 21, 1982

[51] Int. Cl.³ .......................................... H01M 14/00
[52] U.S. Cl. ...................................... 429/8; 429/120
[58] Field of Search .................. 429/120, 26, 8; 361/383, 386

[56] References Cited

U.S. PATENT DOCUMENTS 3,745,048 7/1973 Dinkler et al. ................. 136/166
3,837,918 9/1974 Nakabayashi .................. 429/120 X
4,229,687 10/1980 Newman ........................ 429/120 X
4,383,013 5/1983 Bindin ........................... 429/120 X Primary Examiner—Charles F. LeFevour
Attorney, Agent, or Firm—Henry J. Policinski

[57] ABSTRACT

The disclosure relates to a system for maintaining an aircraft battery at its optimum operating temperature. A continuous air flow around the batteries is provided. When cooling the batteries, the system operates in a flow-through mode. When heating the batteries, the system may operate in either a flow-through mode or in a closed loop recirculating mode. A thermostat may determine the crossover point between cooling and heating. Several valve and thermostat arrangements are disclosed to convert the air flow from a flow-through system to a recirculating system.

12 Claims, 7 Drawing Figures

AIR HEATING AND COOLING SYSTEM FOR AIRCRAFT BATTERIES

DESCRIPTION

Technical Field

The present invention relates to a system for maintaining an aircraft battery at its optimum operating temperature. Aircraft batteries may be subjected to extremely high and low operating temperatures. The high temperatures may result from either high ambient temperatures outside the battery case or from heat generated by discharging and/or charging the batteries. Low temperatures are generally encountered through low ambient atmospheric conditions.

Aircraft engine starting batteries, particularly batteries used to start turbine engines, lose a considerable amount of starting power when they are allowed to cold soak in low ambient temperatures for an extended period of time. An aircraft battery may deliver 97% of its potential starting powers at 20° C., but further declines in battery temperature result in an exponential loss of starting power so that in some aircraft the battery does not have sufficient power delivery capability to start the aircraft engine when the temperature has dropped to the $-20C.$ to $-50C.$ range. The low ambient temperature, in addition to reducing the power delivery capability of the battery, increases the viscosity of the engine lubricants and thus increases the power required to start the colder engine.

One technique used to heat batteries subjected to prolonged periods of cold soak involves the use of electric heater blankets incorporated into the battery case. This technique has several distinct disadvantages: (1) the electric heater must be sealed against the intrusion of potassium hydroxide that is present in the nickel cadmium battery cells within the battery case; (2) the heater must remain sealed for the life of the battery in an environment subjected to shock, vibration, potassium hydroxide, and extreme temperature differentials; (3) increasing the rate of "heat-up" for the battery requires significant weight penalties; (4) there is an increased complexity for the battery assembly which must be tailored for each application; (5) finally, no provision is simultaneously made for cooling the battery.

SUMMARY OF THE INVENTION

The present invention is a system for maintaining an aircraft battery at its optimum operating temperature.

By maintaining the temperature of the battery cell electrolyte at or near the optimum design temperature the performance of the battery can be greatly enhanced. If the cell temperature is too high, the service life of the battery is reduced. If the cell temperature is too low, the performance (the power delivery capability) of the battery is substantially impaired.

The present invention provides both heating and cooling means for the battery cells. Heating is accomplished with an air heating system having a means for recirculating heated air around the battery cells. A low cost external heater is used that is mounted outside the potassium hydroxide environment. Cooling is accomplished by circulating ambient atmospheric air around the battery cells. Insulation may be provided around the battery to reduce the heat transfer rate between the battery and the ambient atmospheric air. The insulation thus provides a very low temperature change rate for the battery when the air system is shut down.

The present invention is particularly suited to aircraft batteries which comprise a plurality of nickel cadmium cells within the battery case. The cells are provided with ribs on their external surface to define air passageways between the individual cells. The battery also defines an air feed plenum below the cells and air exhaust plenum above the cells. An air inlet means is provided for communicating with ambient atmospheric air. An air exhaust means is provided for routing air from the air exhaust plenum in the battery case to the ambient atmosphere.

Means for generating an air pressure differential between the inlet and exhaust conduits is provided. When cooling, the air pressure differential is generated by air pressure differentials between the inlet and outlet ports that are open to ambient atmospheric air. When heating, a recirculating loop is opened between the air access inlet conduit while the access ambient atmospheric air is closed off. A blower and air heating means are provided in the recirculating loop to heat and circulate the air through the battery.

A valve means responsive to the temperature of the cells inside the battery case is used to change the air flow from a flow-through system when cooling is desired to a recirculating loop when heating is desired.

In another embodiment of the invention, two thermostats are used, one in the battery case to convert the system from cooling to heating and a second in the heater itself to provide for the highest possible output temperature of the heated air at all times. This provides the highest possible temperature air to the battery cells with the greatest allowable temperature differential and thus the fastest battery temperature change.

In one embodiment of the invention, the valve means may comprise a thermostatic valve on the air exhaust line and a check valve on the air inlet line to provide for a circulating system once the thermostatic valve is energized. In another embodiment of the invention, a three-port valve is used to select the incoming air for the battery. In one position, it selects outside ambient air for cooling, while in the other position, it selects recirculated air for heating.

BEST AND VARIOUS MODES FOR CARRYING OUT THE INVENTION

Figure 1:
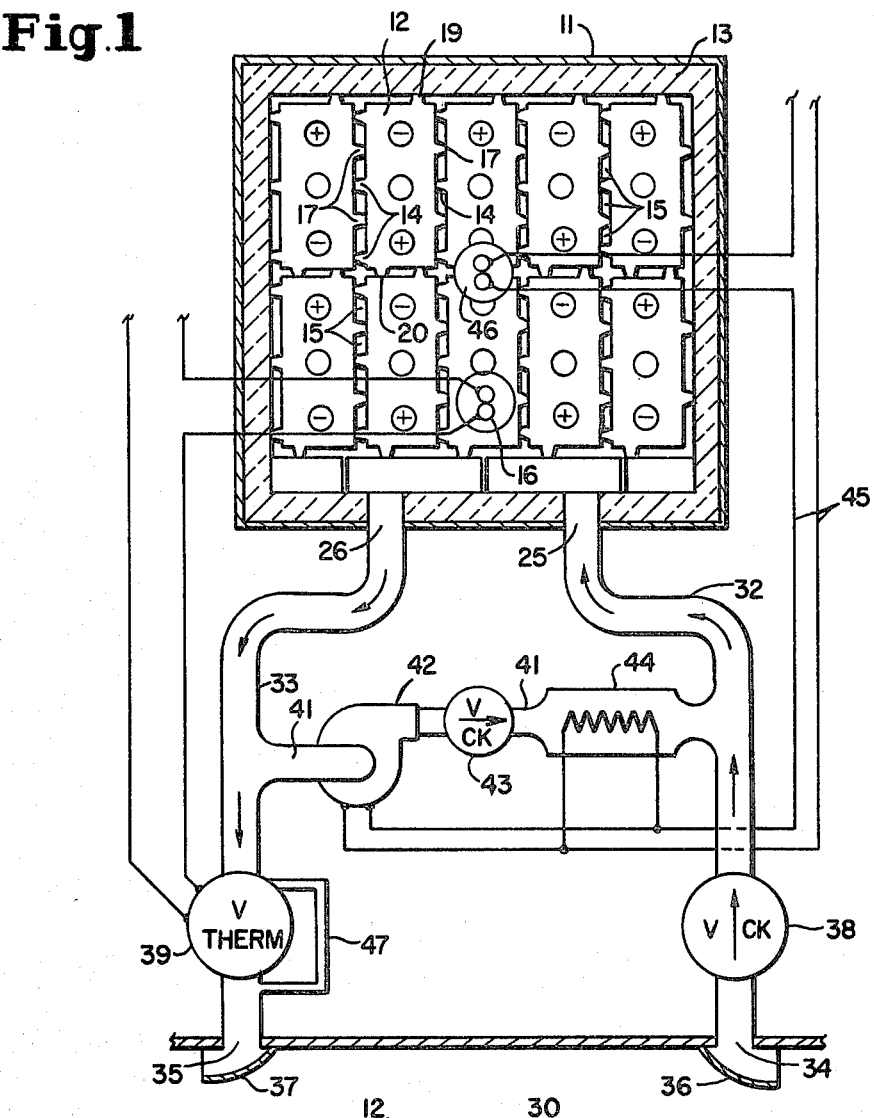
FIG. 1 is a diagrammatic view of the heating and cooling system of the present invention connected to an aircraft battery having a plurality of individual cells.

FIG. 1 illustrates a system for maintaining an aircraft battery at its optimum operating temperature. As indicated, aircraft batteries may be subjected to extremely high or extremely low operating temperatures. High operating temperatures are generally the result of a rapidly charging and/or discharging battery, while low operating temperatures generally arise from low ambient atmospheric temperatures.

Figure 7:
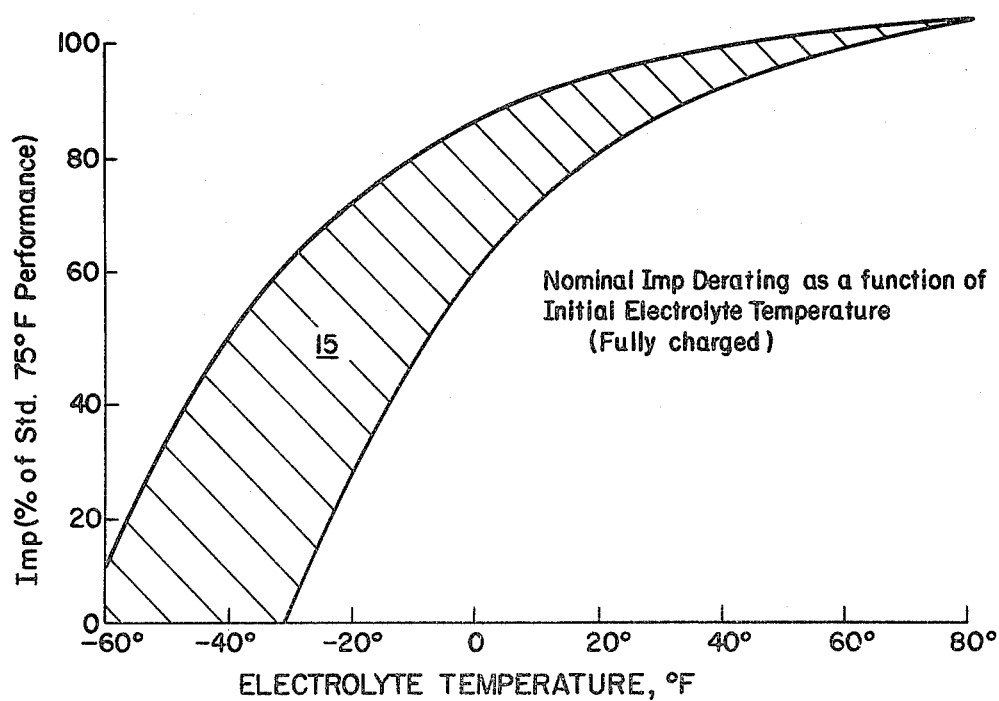
FIG. 7 is a graph illustrating the derating of an aircraft battery's power delivery capability as a function of its initial electrolyte temperature.

Operating temperatures that are too high reduce the service life for the battery. Operating temperatures that are too low reduce the power delivery capability to start the aircraft engine. For example, batteries used for starting aircraft engines lose a substantial amount of starting power or power delivery capability when they are allowed to "cold soak" in low ambient temperatures for an extended period of time. FIG. 7 is a graph which illustrates the nominal $I_{mp}$ derating as a function of initial electrolyte temperature beginning at 80° F. and ending at −60° F. The $I_{mp}$ (power delivery capability) varies as a function of temperature and as illustrated in FIG. 7 the current output of the battery can reach zero at temperatures ranging from −38° F. to −70° F. $I_{mp}$, as illustrated in FIG. 7, is the current delivered at 15 seconds of discharge while maintaining 0.6 volts per cell. The range of $I_{mp}$ values illustrated by the cross-hatched area 15 in FIG. 7 is illustrative of the range of values that may be encountered with a nickel cadmium battery depending on the physical size and structure of the battery. Although the current output of the battery may not actually decline to zero until −38° F. as illustrated in FIG. 7, its power delivery capability may decline to the point where it is unable to start certain types of aircraft engines at −20° F.

While the purpose of the present invention is to maintain the battery at its optimum operating temperature, the present invention is also useful for warming a battery that has been allowed to cold soak in low ambient atmospheric temperatures. The present invention provides for a very high temperature change rate when the system is actuated to drive the battery temperature toward its desired operating temperature. This high temperature change rate is achieved in the present invention by recirculating hot air around each of the cells in the battery.

As will hereinafter be described in greater detail with respect to FIG. 1, the present invention defines a plurality of air passageways 15 that surround each of the cells of the battery and communicate with an air inlet plenum arranged below the individual cells 12 and an air exhaust plenum arranged above the individual cells. An air inlet means 32 supplies air to the air inlet plenum from either the air heating means 44 or from the outside atmospheric air through air inlet 34 as desired to provide the necessary heating or cooling of the individual cells 12. The heating and cooling cycles are determined by thermostat 16 which is located within the battery and preset for the desired operating temperature of the battery. Thermostat 16 is wired in series with thermostatic valve 39 to change the air flow system from a flow through system when cooling is desired to a recirculating system when heating is desired. When the system is cooling the battery, ambient atmospheric air is circulated through the cells by means of an air pressure differential created outside the aircraft. This differential pressure is created by means of a blower, or by positioning the air inlet and air exhaust ports on the exterior of the plane to create an air pressure differential when the aircraft is in motion.

When the system is heating the battery, blower 42 provides an air pressure differential between the air inlet means and the air exhaust means to circulate heated air between the inlet and exhaust plenums. The recirculated air is heated by a small external heater 44. A separate thermostat 46 is used to actuate blower 42 and heater 44.

The second thermostat 46 normally operates at a lower temperature than thermostat 16, to prevent cycling of the system between heating and cooling modes.

Figure 5:
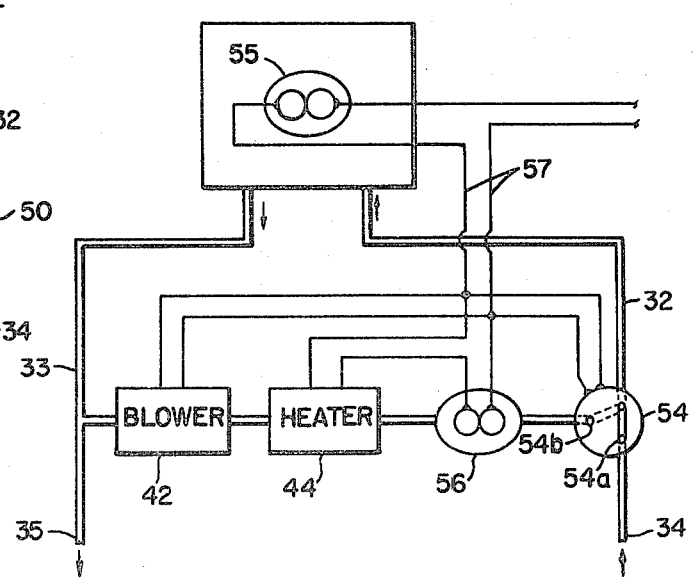
FIG. 5 is a diagrammatic view of still another alternate embodiment of the invention

As illustrated in FIG. 5, a second thermostat 56 may also be placed in the recirculated hot air to maintain the recirculated hot air at the maximum temperature desired. This enables the system to provide for the maximum temperature change rate without damaging any of the cell components.

While the present invention provides for a high temperature change rate when the system is in operation, insulation 13 is used to surround the battery cells and provide a low temperature change rate when the system is not in operation. A low temperature change rate results when a high thermal time constant is provided.

The thermal time constant is the time it takes to cool or heat the battery from its initial starting temperature to 63.2 percent of the differential between the initial temperature and the temperature of the heating or cooling air. Thus, if the battery were at 120°, and it were desired to cool the battery with 20° air, the thermal time constant is equal to the time required to cool the battery to 56.8°.

Using the present invention, system designs have been demonstrated in the laboratory which exhibited a wide difference between time constants of 72 hours when the system was deactivated and less than 30 minutes when the system was activated. This may be compared with a fixed time constant of 6 hours for a typical battery without air cooling or heating or extra insulation. The present invention therefore allows the battery to be brought to its desired operating temperature quickly, and conversely, when the system is deactivated, the battery temperature will drift away from the desired temperature at a very low rate determined by the insulation surrounding the battery cells.

Figure 6:
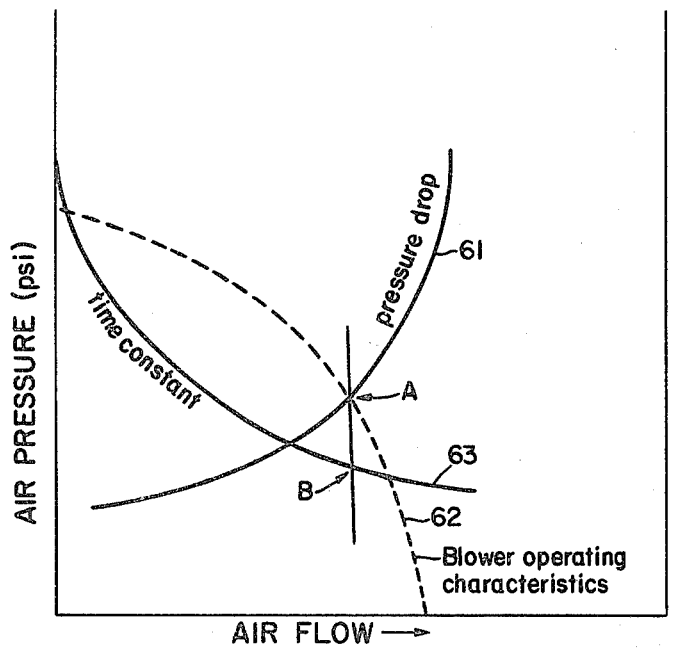
FIG. 6 is a graph that illustrates a battery time constant value achieved by an optimized choice of air flow characteristics in one embodiment of the present invention.

FIG. 6 is a graph which illustrates the relationship between a number of factors which are used in the design of the present invention. The X axis represents air flow and is common to all curves on the graph. One Y axis represents air pressure and is used to plot the pressure drop curve 61 and the blower operating characteristics curve 62. The second Y axis represents time as a function of air flow for the time constant curve 63.

In designing the system, the pressure drop through the battery and the recirculating air system is plotted as a function of air flow and is illustrated by the curve 61. This curve represents a given battery design at various air flow rates and static pressure values.

The pressure drop curve 61 is then plotted with curve 62 which represents the blower's operating characteristic on the same air flow scale and static pressure scale:

Point A, where curve 61 and 62 intersect represents the operating air flow rate for this system, and this technique is used to size the blower 42.

The time constant value for the system may then be found by plotting curve 63, which represents the time constant value for the system. Since the time constant value varies as a function of air flow, the X axis air flow value A is extended to intersect the time constant curve 63 at point B. The Y axis value then is the time constant for the system.

As illustrated in FIG. 1, the battery case 11 may be formed of metal, plastic, wood, rubber, or other shock resistant materials which are adapted to house a plurality of individual battery cells 12. The individual cells are shown enlarged relative to the battery case in FIG. 1 to clearly illustrate air passageways that are defined between the cells. In the preferred embodiment, one or more cells are supplied in the configuration illustrated in FIG. 2. The battery case may also be lined externally or internally with an insulating material 13 which provides a low rate of heat transfer in the deactivated condition as explained above.

Figure 3:
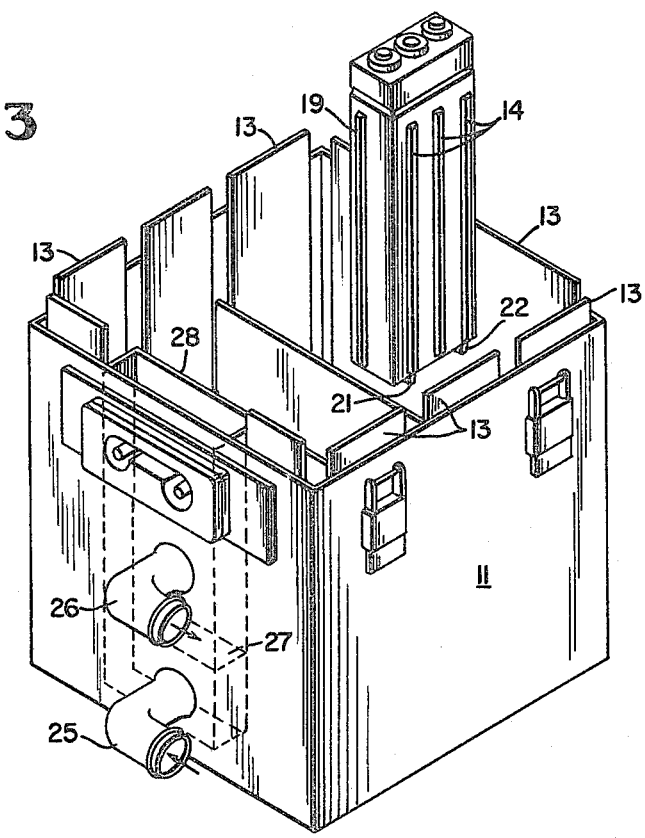
FIG. 3 is an isometric view of the battery case illustrated in FIG. 2 together with a single cell.

Each of the cells 12 is equipped with external ribs 14, on one side and 17 on the other side. Each of the cells also defines ribs 19 and 20 on their respective end walls. These ribs may also be seen in FIG. 3 wherein ribs 14 are illustrated on one side wall and rib 19 is illustrated on one end wall. Also illustrated in FIG. 3 are legs 21 and 22 which assist in defining the air inlet plenum in the lower portion of the battery case as will be hereinafter later described. While the exact configuration of the ribs is not important to the present invention, it is important that the cells 12 and their ribs define therebetween a plurality of air passageways 15 between each of the cells 12. If the ribs 14 on one side of one cell 12 coact with the ribs 17 on the side of another cell 12, individual passageways 15 will be formed together with passageways at each end of the battery. Likewise, legs 21 and 22 present on the bottom of each individual cell, space the cell 12 from the battery case 11 to collectively define an air inlet plenum in the lower portion of the battery case. This air inlet plenum connects with each one of the multiplicity of air passageways 15 defined between the cells 12. In a similar manner, an air exhaust plenum is provided between the tops of the cells 12 and the top of the battery case 11. This air exhaust plenum again communicates with each of the multiplicity of air passageways to provide an exhaust route for the air passing therebetween.

Figure 2:
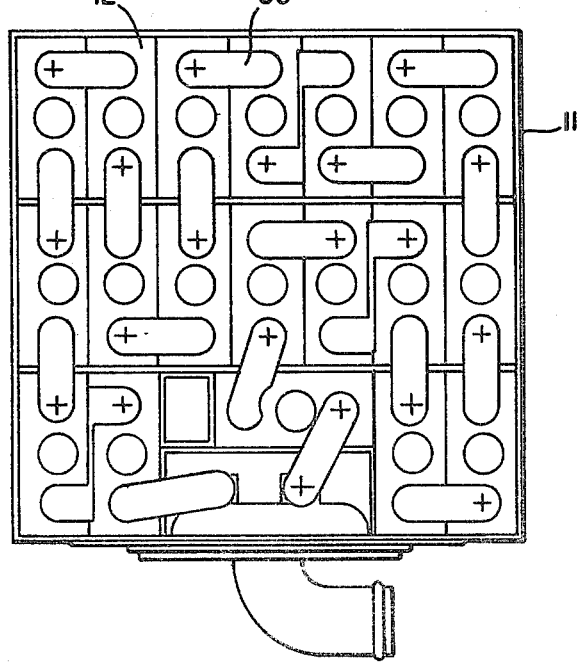
FIG. 2 is a top plan view of a conventional battery case having an air cooling system that may be adapted to the present invention.

As illustrated in FIG. 1, battery case 11 defines an air inlet port 25 and an air exhaust port 26 which communicates with each of the respective plenums. While the ports have been diagrammatically separated horizontally in FIG. 1 for purposes of illustration, as a practical matter they more often take the form illustrated in FIG. 3 with one port arranged above the other. A baffle 27 is then used to separate the two ports to enable the air inlet port to communicate with the lower plenum and an air exhaust port to communicate with the upper plenum. As illustrated in FIGS. 2 and 3, a channel member 28 is defined within the battery case to provide a vertical channel that extends from the exhaust plenum at the top of the case to the air inlet plenum at the bottom of the case 11. This channel is blocked by horizontal baffle 27 that extends across the channel 28 between the air inlet port 25 and the air exhaust port 26.

The air inlet plenum, the air exhaust plenum, and the passageways defined by ribs 14, 17, 19 and 20 on the cells 12 as illustrated in FIG. 1, 2 and 3 are currently used in the prior art to provide cooling for the battery. The inlet and exhaust ports 25 and 26 are commonly connected to a pair of tubes which provide an air pressure differential therebetween by virtue of the operation of the aircraft. The individual battery cells 12 illustrated in FIGS. 1, 2 and 3 are normally nickel cadmium cells and are connected to one another in a series arrangement by virtue of battery connectors 30.

The heating and cooling system of the present invention, as illustrated in FIG. 1, employs an air inlet means which comprises conduit 32 communicating between an atmospheric inlet port 34 and the air inlet port 25 defined by the battery case 11. An air exhaust conduit 33 communicates with the air exhaust port 26 defined by the battery case 11 and an exhaust port 35 defined on the exterior wall of the aircraft. In actual practice, the air inlet and exhaust ports defined on the exterior wall of the aircraft may also define an inlet scarf 36 and an exhaust scarf 37 to provide for an increased air pressure differential between the air inlet means and the air exhaust means when the plane is in motion. Alternatively, ports 34 and 35 may be located on the wings of the aircraft with the inlet port located below the wing and the exhaust port being located above the wing to provide a suitable air pressure differential when air is flowing over the wing. The invention as illustrated in FIG. 1 further comprises a check valve 38 located in the air inlet conduit and a thermostatic valve 39 located in the air exhaust conduit 33. During the cooling operation, air is directed through the inlet port 34, through the check valve 38, through air inlet conduit 32, and into the air inlet plenum defined below the cells 12 in the battery case. The air then circulates upwardly through the air passageways defined between each of the cells 12 and is collected by the air exhaust plenum, the air exhaust outlet 26, the air exhaust conduit 33, and the air exhaust port 35.

When the thermostatic valve 39 closes in response to a signal from thermostat 16, due to a low battery temperature, the air flow is directed from a flow through cooling mode to a recirculating heating mode. Located in the air recirculating loop 41 is a blower 42, check valve 43, and heating means 44. The blower 42 and heating means 44 are energized by means of electrical circuit 45 through a thermostat 46 located within the battery case. Thermostat 46 is normally open, but closes at a battery temperature below that temperature which actuates theremostat 16. When thermostat 46 closes it energizes circuit 45 to activate blower 42 and heating means 44. The difference in temperature set points for thermostats 16 and 46 is established to prevent undesirable system cycling. The air in the recirculating loop 41 is then directed into the air inlet conduit 32 and blocked from exiting the aircraft by means of check valve 38. It then flows upwardly as illustrated in FIG. 1 through the battery case from the air inlet plenum below the battery to the air exhaust plenum above the battery and back to recirculating loop 41. It should be noted that thermostatic valve 39 has a small bypass 47 to provide for constant purging of the battery case itself. During the charging of the battery cells 12, small amounts of oxygen and hydrogen may be given off. Accordingly, an amount of purging airflow is necessary to evacuate these gases from the battery case. When the desired temperature has been reached within the battery case, thermostat 46 opens, thereby disengaging blower 42 and the heating means 44. If the battery temperature is still relatively cool, the thermostatic valve 39 will remain closed. In actual practice, it has been found desirable to set thermostat 46 and thermostat 16 to actuate at battery temperatures of about 40° and 60° F., respectively.

Figure 4:
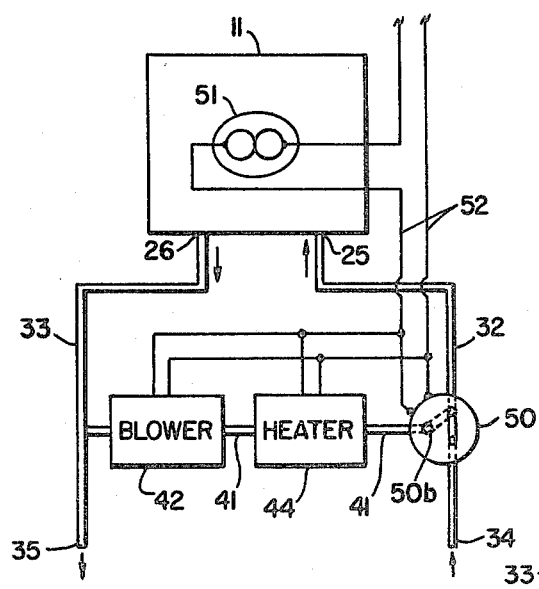
FIG. 4 is a diagrammatic view of still another alternate embodiment of the invention.

An alternate embodiment of the invention is illustrated in FIG. 4. The incoming air is admitted through air inlet port 34, air inlet conduit 32, and the battery case inlet port 25 to circulate between the cells in the manner previously described with respect to FIGS. 1, 2 and 3. The air is then exhausted through exhaust port 26, air exhaust conduit 33, and the exhaust port 35 defined by the exterior of the aircraft. A recirculating loop 41 is also formed between the air inlet conduit 32 and the air exhaust conduit 33. The recirculating loop 41 also has defined therein a blower 42 and a heater 44 as was previously described with respect to FIG. 1.

At the juncture of the recirculating loop 41 and the air inlet conduit 32 is a three-port valve 50 which selects either inlet port 34, or the recirculating loop 41. The three-port valve 50 is controlled by means of a thermostat 51 which is located within the battery case and is responsive to battery tamperature. Thermostat 51 is normally open, but when closed energizes electrical circuit 52, thereby starting blower 42, the heating means 44, and activating the three-port valve 50. Thermostat 51 is set at a temperature level that will provide heating for the battery before the power delivery capability of the battery has appreciably deteriorated. As illustrated in FIG. 4, three-port valve 50 is normally open to the air inlet port 34 and when energized swings upwardly to the dotted position illustrated by 50b to define a recirculating loop for heating the battery. An air pressure differential is created by blower 42 and the recirculating air is heated by air heating means 44. When the temperature within the battery case has reached the desired temperature level, thermostat 41 opens, disengaging the blower 42 and the heater 44, sending the three-port valve back to the position illustrated in FIG. 4 to communicate with incoming air from port 34.

FIG. 5 illustrates still another embodiment of the invention. As illustrated in FIG. 5, the operation of the air system involving the air inlet conduits, the air outlet conduits, blower 42, and the three-port valve 54 is identical to that of FIG. 4. In FIG. 5, however, two thermostats are used. The first thermostat 55 is placed in the battery case and is responsive to the battery temperature. The second thermostat 56 is placed in the recirculating loop and is used to energize heater 44.

The first thermostat 55 is set at a temperature level that will provide substantially full power delivery capability for the battery and thus prevent the $I_{mp}$ derating illustrated in FIG. 7.

The second thermostat 56 is set at a temperature level that will provide the highest operating air temperature compatible with the materials used in the battery. When the battery temperature drops below a predetermined level, thermostat 55 closes, energizing circuit 57 and providing power to blower 42 and to the heating circuitry involving heater 44 and thermostat 56. Simultaneously, three-port valve 54 moves from the flow-through position illustrated at 54a to the recirculating position illustrated at 54b to provide a recirculating loop for the air pressure differential created by blower 42. The embodiment illustrated in FIG. 5 has a distinct advantage over the embodiment illustrated in FIG. 4. Specifically, the embodiment of FIG. 5 permits delivery of the hottest possible battery inlet air without exceeding the maximum allowable battery inlet air temperature set by the materials used in the battery. Hence, the output temperature of the heating system supplied to the battery may be maintained by a constant maximum allowable value without regard to battery exhaust air temperature to accomplish the shortest possible heat-up time.

It is understood that the invention is not limited to the specific details of the embodiments described above but rather includes all possible equivalent techniques and means within the spirit and scope of the invention as defined by the following claims:

What is claimed is:

1. A heating and cooling system for an aircraft battery, said system comprising:
    a battery case for holding a plurality of cells, said cells being spaced from one another to provide at least one air passageway between each of said cells, said passageway having first and second ends, said battery case also defining an air inlet plenum opening to the first end of said air passageway and an air exhaust plenum opening to the second end of said air passageway;
    air inlet means for providing air to said inlet plenum and air exhaust means for exhausting air from said exhaust plenum;
    means for providing an air pressure differential to circulate air from said air inlet means through said battery case to said air exhaust means;
    air heating means operatively mounted with said battery case to heat air prior to said air passing to said air inlet means; and
    means responsive to the temperature in said battery case to alter the air flow of said system from a flow through system to a recirculating system, said means recirculating air from said air exhaust means through said air heating means to said air inlet means when the temperature in the battery case drops to an undesirably low level.

2. A heating and cooling system for an aircraft battery as claimed in claim 1 further including valve means responsive to the temperature in said battery case to alter the air flow of said system from a flow through system to a closed loop system, said valve means recirculating substantially all of the air from said air exhaust means through said air heating means to said air inlet means when the temperature in the battery case drops to an undesirably low level.

3. A heating and cooling system for an aircraft battery as claimed in claim 2 wherein said valve means comprises a valve in the exhaust means and a first check valve in the air inlet means.

4. A heating and cooling system for an aircraft battery as claimed in claim 2 wherein said valve means further defines a bypass means for providing a continuous purging of gases generated by the cells from the system.

5. A heating and cooling system for an aircraft battery as claimed in claim 3 which further includes a second check valve in said closed loop to provide flow of said air through said air heating means in only one direction.

6. A heating and cooling system for aircraft batteries as claimed in claim 2 wherein said valve means further comprises a three-port valve in said air inlet means, said three-port valve having a first inlet port communicating with said air heating means, a second inlet port communicating with an air inlet and an output port communicating with the air inlet plenum defined by said battery case.

7. A heating and cooling system for aircraft batteries as claimed in claim 2 wherein said system further comprises an electrical thermostat sensing the temperature of said battery and an electrical actuator for said valve means, said thermostat energizing the valve means when said battery temperature decreases to an undesirably low level.

8. A heating and cooling system for aircraft batteries as claimed in claim 7 wherein said system further includes a second thermostat sensing the temperature of air from said air heating means, said second thermostat to energize said heating means when temperature of said air circulating therethrough decreases to an undesirably low level.

9. A heating and cooling system for aircraft batteries as claimed in claim 2 wherein said means for providing an air pressure differential further includes:

blower means mounted in said closed loop with said air heating means, said air inlet means and said air exhaust means disposed to provide an air pressure differential in response to relative movement between each of said means and ambient air.

10. A heating and cooling system for aircraft batteries as claimed in claim 9 wherein said system further comprises thermostat means sensing the temperature of said battery, an electrically operated blower and an electrical actuator for said valve means, said thermostat energizing the valve means to block ambient air from entering the system.

11. A heating and cooling system for aircraft batteries as claimed in claim 10 wherein said thermostat means energizes said blower.

12. A heating and cooling system for aircraft batteries as claimed in claim 10 wherein said system further includes a second thermostat means sensing the air temperature in said closed loop, said second thermostat means energizing said air heating means when said closed loop air temperature decreases to an undesirably low level.

* * * * *